US012771461B2

(12) United States Patent
Yokobori

(10) Patent No.: US 12,771,461 B2
(45) Date of Patent: Oct. 20, 2026

(54) MOBILE TERMINAL TESTING DEVICE AND TERMINAL INFORMATION ANALYSIS METHOD THEREOF

(71) Applicant: ANRITSU CORPORATION, Kanagawa (JP)

(72) Inventor: Kuniyuki Yokobori, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 304 days.

(21) Appl. No.: 18/630,318

(22) Filed: Apr. 9, 2024

(65) Prior Publication Data

US 2024/0356660 A1 Oct. 24, 2024

(30) Foreign Application Priority Data

Apr. 19, 2023 (JP) ................................ 2023-068623

(51) Int. Cl.
*H04B 17/00* (2015.01)

(52) U.S. Cl.
CPC ................................ *H04B 17/0085* (2013.01)

(58) Field of Classification Search
CPC ..... H04B 17/0085; G06F 16/901; G06F 8/65; G06F 16/90335
See application file for complete search history.

(56) References Cited

U.S. PATENT DOCUMENTS

| | | | | |
|---|---|---|---|---|
| 10,856,159 B2 * | 12/2020 | Chinbe | .................. | H04W 8/22 |
| 11,375,506 B2 * | 6/2022 | Yamasaki | ............ | H04W 24/08 |
| 2021/0258810 A1 | 8/2021 | Ueda | | |
| 2021/0337405 A1 * | 10/2021 | Sato | ...................... | H04W 8/24 |

FOREIGN PATENT DOCUMENTS

| | | | | | |
|---|---|---|---|---|---|
| JP | 2021-129260 A | | 9/2021 | | |
| JP | 2021175103 A | * | 11/2021 | ............. | H04W 8/24 |
| KR | 20130019550 A | * | 2/2013 | ......... | H04B 17/0085 |
| KR | 101370553 B1 | * | 3/2014 | ........... | H04W 24/06 |

* cited by examiner

*Primary Examiner* — Curtis A Kuntz
(74) *Attorney, Agent, or Firm* — McDonald Hopkins LLC

(57) ABSTRACT

The mobile terminal testing device includes a terminal information storage unit that stores information on a mobile terminal to be tested, an information request unit that transmits an RF signal requesting the mobile terminal to transmit UE Capability Information, a data reception unit that outputs the UE Capability Information received from the mobile terminal to a data conversion unit, the data conversion unit that decodes the received UE Capability Information based on a data structure information stored in a data structure information storage unit and generates character string data, the data structure information storage unit that stores the data structure information which defines the data structure of the UE Capability Information, and a character string search unit that searches the character string data generated by the data conversion unit for information necessary for a test.

4 Claims, 3 Drawing Sheets

```
JE-NR-Capability
JE-NR-Capability ::= SEQUENCE [11100110001]
  +-accessStratumRelease ::= ENUMERATED [rel16]
  +-pdcp-Parameters ::= SEQUENCE [111111]
  | +-supportedROHC-Profiles ::= SEQUENCE
  | | +-profile0x0000 ::= BOOLEAN [TRUE]
  | | +-profile0x0001 ::= BOOLEAN [TRUE]
  | | +-profile0x0002 ::= BOOLEAN [TRUE]
  | | +-profile0x0003 ::= BOOLEAN [FALSE]
  | | +-profile0x0004 ::= BOOLEAN [TRUE]
  | | +-profile0x0006 ::= BOOLEAN [FALSE]
  | | +-profile0x0101 ::= BOOLEAN [FALSE]
  | | +-proftle0x0102 ::= BOOLEAN [FALSE]
  | | +-profile0x0103 ::= BOOLEAN [FALSE]
  | | +-profile0x0104 ::= BOOLEAN [FALSE]
  | +-maxNumberROHC-ContextSessions ::= ENUMERATED [cs16]
  | +-uplinkOnlyROHC-Profiles ::= ENUMERATED [supported] OPTIONAL:Exist
  | +-continueROHC-Context ::= ENUMERATED [supported] OPTIONAL:Exist
  | +-outOfOrderDelivery ::= ENUMERATED [supported] OPTIONAL:Exist
  | +-shortSN ::= ENUMERATED [supported] OPTIONAL:Exist
  | +-pdcp-DuplicationSRB ::= ENUMERATED [supported] OPTIONAL:Exist
  | +-pdcp-DuplicationMCG-OrSCG-DRB ::= ENUMERATED [supported] OPTIONAL:Exist
  | +-EXTENSION ::= SEQUENCE [0]
  |   +-VERSION-BRACKETS1 ::= SEQUENCE OPTIONAL:Omit
  +-rlc-Parameters ::= SEQUENCE [111] OPTIONAL:Exist
  | +-am-WithShortSN ::= ENUMERATED [supported] OPTIONAL:Exist
  | +-um-WithShortSN ::= ENUMERATED [supported] OPTiONAL:Exist
  | +-um-WithLongSN ::= ENUMERATED [supported] OPTiONAL:Exist
  | +-EXTENSION ::= SEQUENCE [0]·
  |   +-VERSION-BRACKETS1 ::= SEQUENCE OPTIONAL:Omit
```

FIG. 2

MOBILE TERMINAL TESTING DEVICE AND TERMINAL INFORMATION ANALYSIS METHOD THEREOF

TECHNICAL FIELD

The present invention relates to a mobile terminal testing device for testing a mobile terminal.

BACKGROUND ART

In a case where a mobile terminal, such as a mobile phone or a data communication terminal, for performing communication while moving is developed, it is necessary to test whether or not the developed mobile terminal normally performs communication. Therefore, a test is performed to confirm the content of communication by connecting a mobile terminal to be tested to a testing device that operates as a pseudo base station that simulates functions of an actual base station and performing communication between the testing device and the mobile terminal.

Upon executing the test, there is a case where information on the mobile terminal to be tested is necessary. The information on the mobile terminal is set in User Equipment (UE) Capability Information that can be acquired through the communication with the mobile terminal.

Patent Document 1 discloses a technology of decoding all UE Capability Information acquired from a mobile terminal through an analysis process, and performing display on an operation display screen so that the meaning of information, set values, and the like are understood.

RELATED ART DOCUMENT

Patent Document

[Patent Document 1] JP-A-2021-129260

DISCLOSURE OF THE INVENTION

Problem that the Invention is to Solve

However, it takes time to perform the analysis process to decode all the UE Capability Information through the analysis process by processing a program and to perform display on the operation display screen.

Furthermore, a data structure of the UE Capability Information changes due to standard version upgrade and the like, and, in such a case, it is necessary to modify the program of the analysis process to respond to the change.

Therefore, the present invention provides a mobile terminal testing device that can reduce processing loads and easily respond to a change in a data structure by decoding information on a mobile terminal based on information on a predetermined data structure.

Means for Solving the Problem

A mobile terminal testing device of the present invention is a mobile terminal testing device for testing a mobile terminal by simulating a base station of mobile communication, the mobile terminal testing device including a data conversion unit that decodes UE Capability Information received from the mobile terminal based on predetermined data structure information to generate character string data.

With the configuration, the UE Capability Information is decoded based on predetermined data structure information and the character string data is generated. Therefore, the processing loads can be reduced and the change in a data structure can be easily responded.

Further, in the mobile terminal testing device of the present invention, the data structure information is written in Abstract Syntax Notation One (ASN. 1).

Further, the mobile terminal testing device of the present invention further includes a data structure information storage unit that stores the predetermined data structure information, a character string search unit that searches the character string data generated by the data conversion unit for information necessary for a test case, and provides a notification of the searched information, and a terminal information storage unit that adds the information notified by the character string search unit and updates stored information on the mobile terminal.

With this configuration, the UE Capability Information is decoded based on the data structure written in ASN. 1 and the character string data is generated. Therefore, the processing loads can be reduced and the change in a data structure can be easily responded.

Further, a terminal information analysis method of the present invention is a terminal information analysis method of a mobile terminal testing device for testing a mobile terminal by simulating a base station of mobile communication, the method including decoding UE Capability Information received from the mobile terminal based on predetermined data structure information to generate character string data.

Further, in the terminal information analysis method of the present invention, the data structure information is written in ASN. 1.

Further, the terminal information analysis method of the present invention further includes searching the character string data for information necessary for a test case and providing a notification of the searched information, and adding the notified information and updating stored information on the mobile terminal.

With the configuration, the UE Capability Information is decoded based on predetermined data structure information and the character string data is generated. Therefore, the processing loads can be reduced and the change in a data structure can be easily responded.

Advantage of the Invention

The present invention can provide a mobile terminal testing device that can reduce processing loads and can easily respond to a change in a data structure.

BRIEF DESCRIPTION OF THE DRAWINGS

FIG. 2 is a diagram illustrating an example of decoded character string data of the mobile terminal testing device according to the embodiment of the present invention.

BEST MODE FOR CARRYING OUT THE INVENTION

Hereinafter, a mobile terminal testing device according to an embodiment of the present invention will be described in detail with reference to the drawings.

Figure 1:
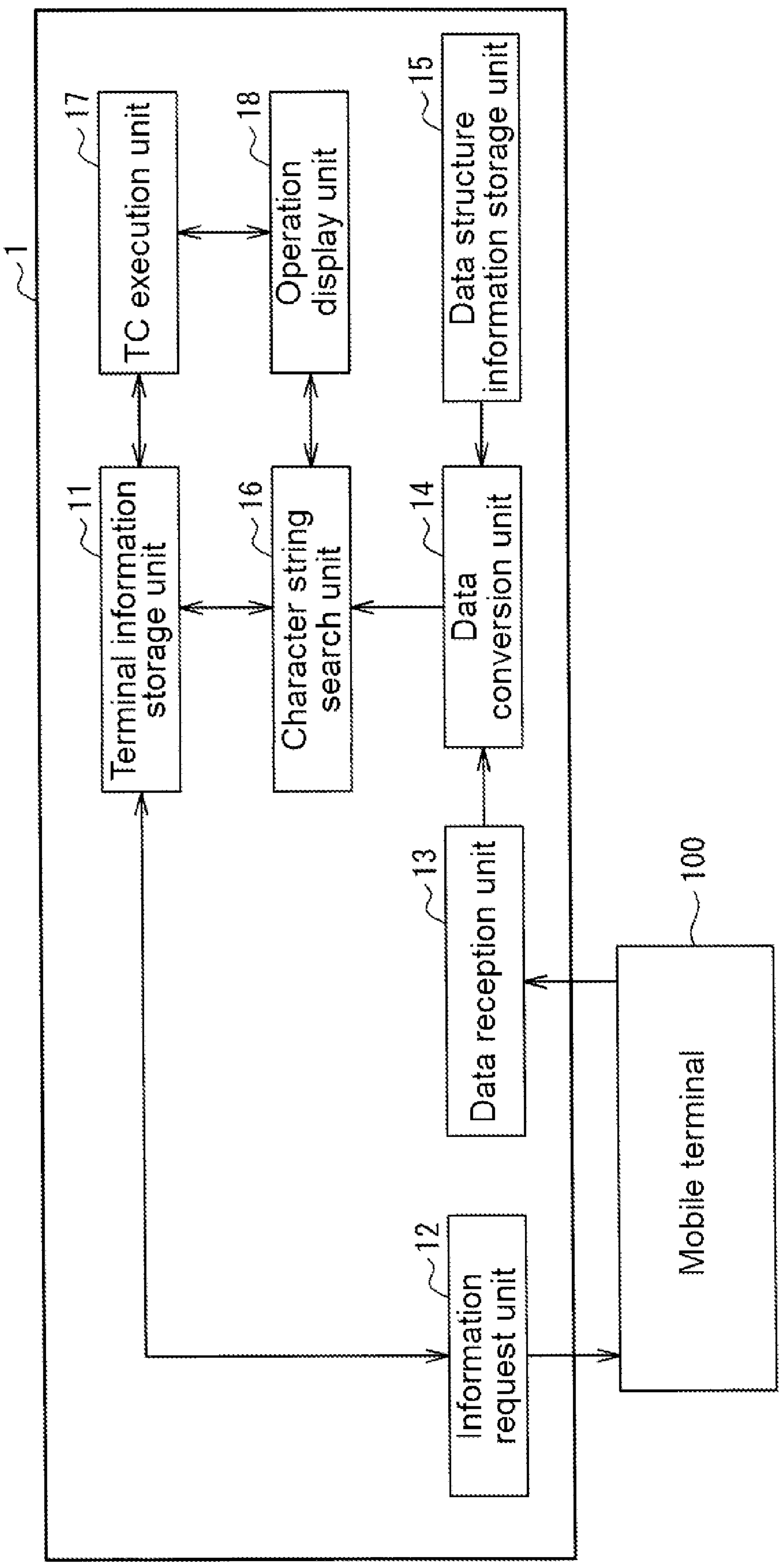
FIG. 1 is a block diagram illustrating a mobile terminal testing device according to an embodiment of the present invention.

In FIG. 1, a mobile terminal testing device 1 according to one embodiment of the present invention transmits and receives a radio frequency (RF) signal to and from a mobile terminal 100 by wire via a coaxial cable or the like as a pseudo base station. The mobile terminal testing device 1 may wirelessly transmit and receive the RF signal to and from the mobile terminal 100 via an antenna.

The mobile terminal testing device 1 includes a terminal information storage unit 11, an information request unit 12, a data reception unit 13, a data conversion unit 14, a data structure information storage unit 15, a character string search unit 16, a Test Case (TC) execution unit 17, and an operation display unit 18.

The terminal information storage unit 11 stores information on the mobile terminal 100 to be tested, for example, for each model of the mobile terminal 100.

The information request unit 12 transmits an RF signal requesting the mobile terminal 100 to transmit UE Capability Information.

The data reception unit 13 receives the UE Capability Information from the mobile terminal 100, and outputs the received UE Capability Information to the data conversion unit 14.

The data conversion unit 14 decodes the received UE Capability Information based on data structure information stored in the data structure information storage unit 15, and generates character string data including parameter names, setting values, and the like as character strings.

The data structure information storage unit 15 stores the data structure information that defines the data structure of the UE Capability Information. The data structure information is written in, for example, Abstract Syntax Notation One (ASN. 1).

The data conversion unit 14 decodes the UE Capability Information based on, for example, the data structure of the UE Capability Information stored in the data structure information storage unit 15 and written in ASN. 1, and generates character string data as shown in FIG. 2.

The character string search unit 16 searches the character string data generated by the data conversion unit 14 for information necessary for the test.

The TC execution unit 17 controls the execution of a test case selected by a user. The TC execution unit 17 acquires information on the mobile terminal 100 necessary for the selected test case from the mobile terminal 100.

The operation display unit 18 includes an input unit that accepts an operation input from the user, and a display unit that displays a parameter setting screen, a test result, and the like. The input unit includes a touch pad, a keyboard, a push button, and the like. The display unit includes a liquid crystal display device or the like.

In the present embodiment, the TC execution unit 17 acquires the information on the mobile terminal 100 necessary for the test case selected by the user from the UE Capability Information received from the mobile terminal 100.

The TC execution unit 17 notifies the terminal information storage unit 11 of the information on the mobile terminal 100 necessary for the test case selected by the user and the identification information of the mobile terminal 100 to be tested, and acquires necessary information.

Based on the identification information of the mobile terminal 100, the terminal information storage unit 11 checks whether information on the model of the mobile terminal 100 is stored. In a case where the information necessary for the selected test case is not stored, the terminal information storage unit 11 transmits a signal requesting transmission of the UE Capability Information to the mobile terminal 100 using the information request unit 12. Further, the terminal information storage unit 11 notifies the character string search unit 16 of the information necessary for the selected test case.

The data conversion unit 14 decodes the UE Capability Information received from the mobile terminal 100 based on the data structure information of the UE Capability Information stored in the data structure information storage unit 15 and written in ASN. 1.

In TS38.331 of 3rd Generation Partnership Project (3GPP), which creates wireless communication standards, the data structure of the UE Capability Information is written in ASN. 1. For this reason, in a case where the ASN. 1 defined in TS38.331 is stored in the data structure information storage unit 15, the UE Capability Information is decoded using the data structure defined in TS38.331.

Furthermore, even in a case where the data structure of the UE Capability Information is changed due to a standard version upgrade or the like, it is possible to respond to a newly defined data structure without changing a program by only replacing the data structure information stored in the data structure information storage unit 15 and written in ASN.1 with ASN. 1 which is newly defined in TS38.331.

The data conversion unit 14 outputs the decoded character string data to the character string search unit 16. The character string search unit 16 searches the decoded character string data for the information necessary for the selected test case, the information being notified from the terminal information storage unit 11, and notifies the terminal information storage unit 11 of the searched information.

The terminal information storage unit 11 adds the information notified from the character string search unit 16, updates stored information on the mobile terminal 100, and repeats an information acquisition process from the mobile terminal 100 until all acquirable information is acquired. As a result of acquiring all the acquirable information, the terminal information storage unit 11 notifies the TC execution unit 17 whether or not all the information necessary for the selected test case is available.

The TC execution unit 17 executes test measurement in a case where all the information necessary for the selected test case is available, and executes a next test case without performing the test in a case where all the information necessary for the selected test case is not available.

Note that when a process of searching for the UE Capability Information is selected by a user's operation on the operation display unit 18, the character string search unit 16 may search the decoded character string data for parameters or the like input by the user and display a search result on a display unit of the operation display unit 18.

Figure 3:
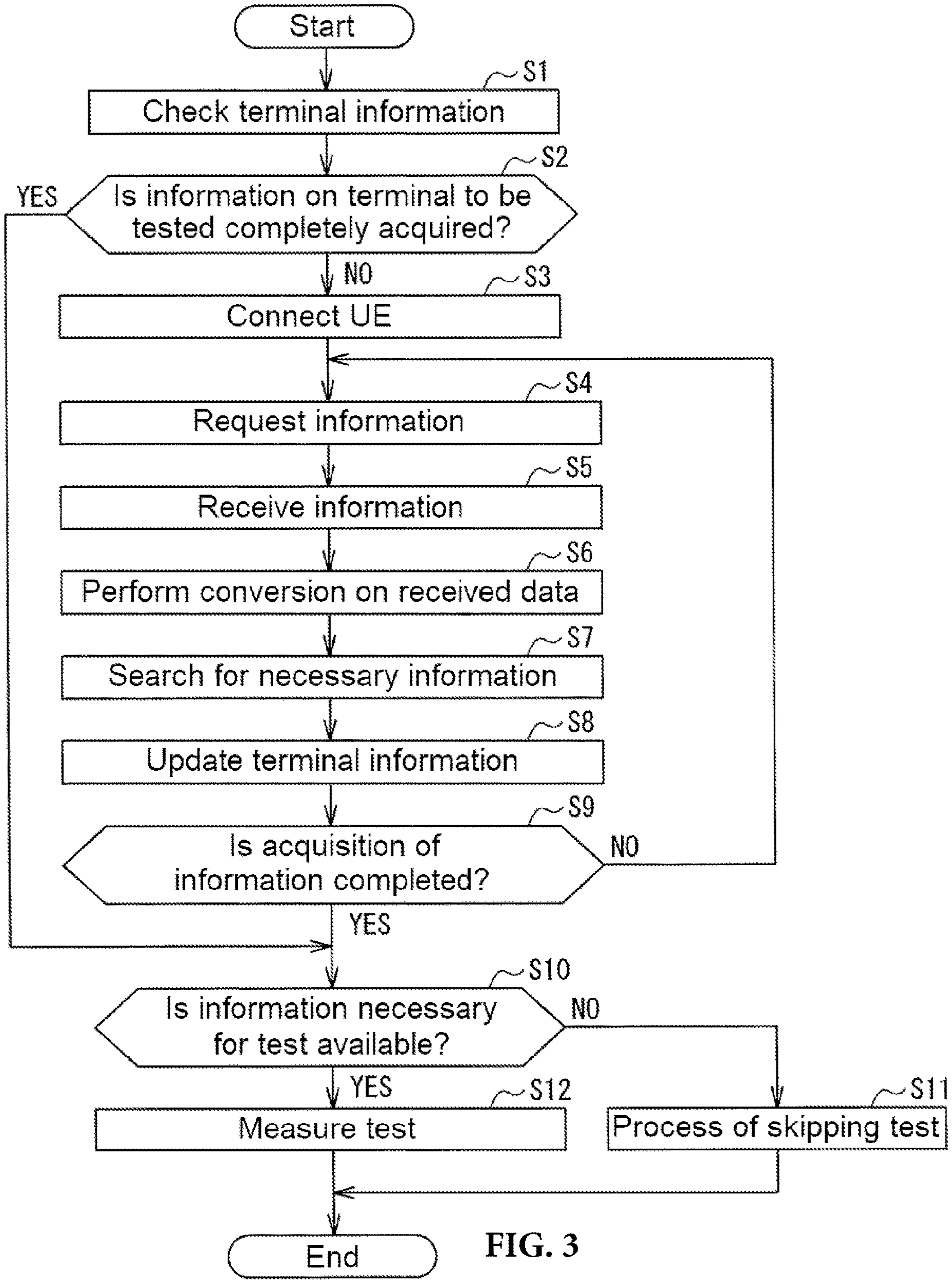
FIG. 3 is a flowchart explaining a procedure of a test execution control process of the mobile terminal testing device according to the embodiment of the present invention.

A test execution control process by the mobile terminal testing device 1 according to the present embodiment, which is configured as described above, will be described with reference to FIG. 3. Note that the test execution control process described below is executed in a case where the test execution is selected through input to the operation display unit 18.

In step S1, the TC execution unit 17 notifies the terminal information storage unit 11 of the information on the mobile terminal 100 and the identification information of the mobile terminal 100, which are necessary for the test case selected by the user, and the terminal information storage unit 11 checks the information on the model of the mobile terminal 100 from the identification information of the mobile terminal 100. After executing the process in step S1, the terminal information storage unit 11 executes a process in step S2.

In step S2, the terminal information storage unit 11 determines whether or not the information on the mobile terminal 100 is completely acquired.

In a case where it is determined that the information on the mobile terminal 100 is completely acquired, the terminal information storage unit 11 executes a process in step S10. In a case where it is determined that the information on the mobile terminal 100 is not completely acquired, the terminal information storage unit 11 executes a process in step S3.

In step S3, the terminal information storage unit 11 requests the information request unit 12 to establish a communication connection with the mobile terminal 100 (UE). After executing the process in step S3, the terminal information storage unit 11 executes a process in step S4.

In step S4, the terminal information storage unit 11 requests the information request unit 12 to transmit an RF signal requesting the mobile terminal 100 to transmit the UE Capability Information. After executing the process in step S4, the terminal information storage unit 11 causes the data reception unit 13 to execute a process in step S5.

In step S5, upon receiving the UE Capability Information from the mobile terminal 100, the data reception unit 13 outputs the received UE Capability Information to the data conversion unit 14. After executing the process in step S5, the data reception unit 13 causes the data conversion unit 14 to execute a process in step S6.

In step S6, the data conversion unit 14 decodes the received UE Capability Information based on ASN. 1 stored in the data structure information storage unit 15 to generate the character string data, and outputs the character string data to the character string search unit 16. After executing the process in step S6, the data conversion unit 14 causes the character string search unit 16 to execute a process in step S7.

In step S7, the character string search unit 16 searches the decoded character string data for the information necessary for the test case, and outputs search results to the terminal information storage unit 11. After executing the process in step S7, the character string search unit 16 causes the terminal information storage unit 11 to execute a process in step S8.

In step S8, the terminal information storage unit 11 updates the terminal information on the mobile terminal 100 using the searched information. After executing the process in step S8, the terminal information storage unit 11 executes a process in step S9.

In step S9, the terminal information storage unit 11 determines whether or not acquisition of the acquirable information from the mobile terminal 100 is completed.

In a case where it is determined that the acquisition of the information is completed, the terminal information storage unit 11 causes the TC execution unit 17 to execute the process in step S10. In a case where it is determined that the acquisition of the information is not completed, the terminal information storage unit 11 executes the process in step S4.

In step S10, the TC execution unit 17 determines whether or not all the information necessary for the selected test case is available.

In a case where it is determined that all the necessary information is available, the TC execution unit 17 executes a process in step S12. In a case where it is determined that all the necessary information is not available, the TC execution unit 17 executes a process in step S11.

In step S11, the TC execution unit 17 executes a test skip process of skipping the selected test case without performing the selected test case. After executing the process in step S11, the TC execution unit 17 ends the test execution control process.

In step S12, the TC execution unit 17 executes the selected test case. After executing the process in step S12, the TC execution unit 17 ends the test execution control process.

In the above-described embodiment, the data conversion unit 14 decodes the received UE Capability Information based on the data structure information stored in the data structure information storage unit 15, and generates data including parameter names, setting values, and the like as character strings.

Therefore, the UE Capability Information is decoded based on the data structure information stored in the data structure information storage unit 15, and the character string data is generated. Therefore, the processing loads can be reduced and the change in a data structure can be easily responded.

Further, the data structure information stored in the data structure information storage unit 15 is written in ASN. 1.

Therefore, the UE Capability Information is decoded based on the data structure written in ASN. 1, and the character string data is generated. Therefore, the processing loads can be reduced and the change in a data structure can be easily responded.

Although an embodiment of the present invention has been disclosed, it will be apparent that modifications may be made by those skilled in the art without departing from the scope of the present invention. All such modifications and equivalents are intended to be included in the following claims.

DESCRIPTION OF REFERENCE NUMERALS AND SIGNS

1 Mobile Terminal Testing Device
11 Terminal Information Storage Unit
12 Information Request Unit
13 Data Reception Unit
14 Data Conversion Unit
15 Data Structure Information Storage Unit
16 Character String Search Unit
17 TC Execution Unit
100 Mobile Terminal

What is claimed is:

1. A mobile terminal testing device for testing a mobile terminal by simulating a base station of mobile communication, the mobile terminal testing device comprising a data conversion unit that decodes UE Capability Information received from the mobile terminal based on predetermined data structure information to generate character string data;

a data structure information storage unit that stores the predetermined data structure information;

a character string search unit that searches the character string data generated by the data conversion unit for information necessary for a test case, and provides a notification of the searched information; and a terminal information storage unit that adds the information notified by the character string search unit and updates stored information on the mobile terminal.

2. The mobile terminal testing device according to claim 1, wherein the data structure information is written in ASN. 1.

3. A terminal information analysis method of a mobile terminal testing device for testing a mobile terminal by simulating a base station of mobile communication, the terminal information analysis method comprising:

decoding UE Capability Information received from the mobile terminal based on predetermined data structure information to generate character string data;

searching the character string data for information necessary for a test case, and providing a notification of the searched information; and adding the notified information and updating stored information on the mobile terminal.

4. The terminal information analysis method according to claim 3, wherein the data structure information is written in ASN. 1.

* * * * *